T. M. CAMPBELL.
WEATHER STRIP.
APPLICATION FILED MAY 28, 1919.
1,345,832.
Patented July 6, 1920.
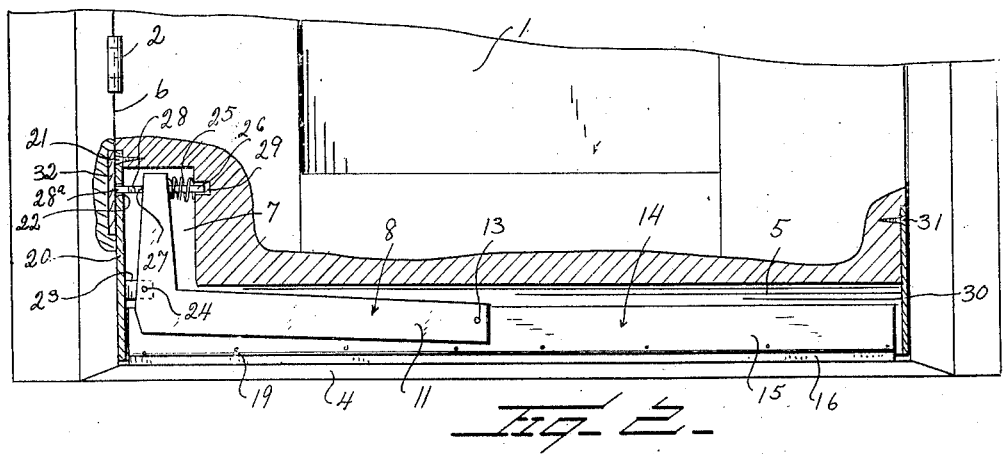
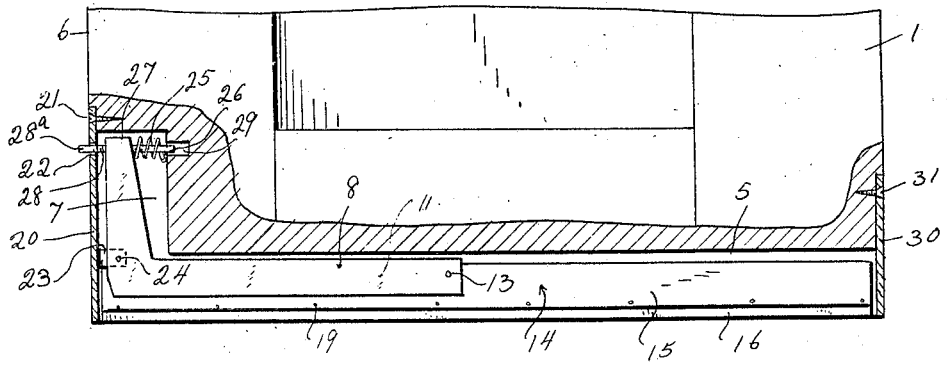
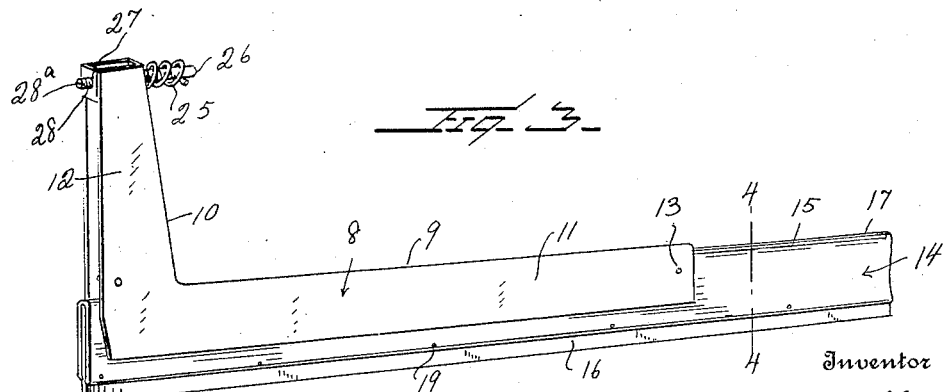
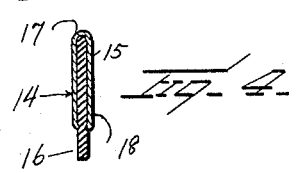
Inventor
T. M. Campbell
By Watson E. Coleman
Attorney

UNITED STATES PATENT OFFICE.

THOMAS M. CAMPBELL, OF DALLAS, TEXAS.

WEATHER-STRIP.

1,345,832.  Specification of Letters Patent.  Patented July 6, 1920.

Application filed May 28, 1919. Serial No. 300,256.

*To all whom it may concern:*

Be it known that I, THOMAS M. CAMPBELL, a citizen of the United States, residing at Dallas, in the county of Dallas and State of Texas, have invented certain new and useful Improvements in Weather-Strips, of which the following is a specification, reference being had to the accompanying drawings.

This invention relates to an improved door weather strip and stop, and the invention aims to provide a very simple, efficient and practical device of this kind, primarily acting as a weather strip to the lower part of the door, when closed.

The invention further aims to provide a door weather strip and stop of this kind, which, when the door is closed will be actuated automatically to close the space between the lower edge of the door and the door sill.

The invention further aims to provide means carried by the door and designed to engage the door jamb, for automatically actuating the door strip and stop when the door is closed.

The invention further aims to provide improved means of connection between the door weather strip and stop and the supporting member, whereby a flexible member of the lower portion of the weather strip may conform to the irregularities of the door sill, in order to completely close the space between the lower edge of the door and the sill.

The invention further aims to provide spring means for yieldingly urging the supporting member for the weather strip, whereby the weather strip may be held raised when the door is open.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in elevation of the lower portion of a door, showing the lower part broken away, thereby illustrating the door weather strip and stop in elevation, showing the lower flexible portion of the weather strip conforming to and engaging the door sill.

Fig. 2 is a view in elevation of the door, showing the frame of the door eliminated, and in fact showing the door open, in which case the door weather strip is in a raised position.

Fig. 3 is an enlarged detail view of the door weather strip and stop detached from the door.

Fig. 4 is a sectional view on line 4—4 of Fig. 3.

Referring more especially to the drawings 1 designates a conventional form of door which is hingedly mounted at 2 to the frame 3, and 4 denotes the sill.

The lower portion of the door is chambered out crosswise of the door, thereby providing an elongated recess 5. The edge portion 6 of the door is chambered out near its lower portion, thereby constructing a vertical recess 7, which is at right angles to and contiguous with the recess 5. A door weather strip support 8 is provided, which is constructed from a single piece of sheet metal, bent upon itself as at 9 and 10, and shaped so as to provide a horizontally disposed portion 11 and a vertically disposed portion 12 at right angles to the portion 11. This support 8 may be bent and shaped, as illustrated in a single operation of a die or other tool (not shown), or may be made by some other suitable method. The inner ends of the sides of the horizontal portion of the support 8 receive a pivot pin 13, which extends transversely of the door weather strip and stop 14. This door weather strip and stop comprises a holder 15 and a flexible or pliable member 16, constructed of any suitable material, preferably rubber, or a composition of rubber and canvas or the like. The holder 15 is constructed from a single piece of sheet metal bent longitudinally upon itself as shown at 17, to provide the opposite sides 18. These sides are closely adjacent each other, and are designed to clamp the flexible or pliable member 16, there being rivets or other securing means 19 passing through the sides 18 and the flexible or pliable strip or member 16, thereby securely holding the strip or member 16 in place.

The upstanding or vertical arm 12 of the support 8 engages the vertical recess 7 of the edge 6 of the door. A cover plate 20 engages over the recess 7 and is secured to the edge 6 of the door by means of suitable screws 21. The upper part of the cover plate 20 has an opening 22, and the lower portion of the cover plate has a supporting lug 23. This lug 23 is positioned between the opposite sides of the upstanding arm or portion 12 of the support 8, there being a pivot pin 24 extending through the sides of the upstanding arm or portion 12 and through the lug 23, thereby pivotally supporting the support 8 in position. It is to be noted that owing to the door weather strip 14 and the longer portion of the support 8 being heavier than the upstanding arm 12, naturally the weather strip will automatically assume a lowered position, when the door is open. However, to counteract this force of gravitation a coil spring 25 (which surrounds a supporting pin 26) is interposed between the bottom wall of the recess 7 and the inner edge of the upstanding arm 12, in order to elevate the longer arm or portion 11 of the support 8 and also the door weather strip. This supporting pin 26 is threaded at 27 between the opposite walls of the upstanding arm 12, and the end portion 28 of the pin 26 engages through the opening 22 of the cover plate. The extremity of the end portion 28 is provided with a screw driver engaging slit 28ª, whereby the pin may be adjusted, for regulating the tension of the spring and adjusting the strip. The inner end of the pin 26 engages a cavity 29 of the upper end of the bottom wall of the recess 7. A cover plate 30 is secured to the free vertical edge of the door by means of screws 31, said plate is countersunk in said edge to be flush therewith and is designed to cover the outer end portion of the recess in the lower edge of the door. An abutment wearplate 32 is secured to the jamb of the door and embedded therein at a point a little below the lower hinge of the door, and it will be seen that when the door is closed, the end portion of the pin 26 will contact with the abutment wearplate 32, forcing the pin 26 inwardly, tilting the support 8, so that the longer arm of the support will move downwardly, and automatically actuate the door weather strip and stop, and since the door weather strip is pivotally mounted on the support 8, the weather strip will assume such a position, as to permit the rubber or similar pliable strip to engage and conform to the door sill. When the door is open, the coil spring 25 will automatically actuate the support 8, in order to raise the weather strip.

The invention having been set forth, what is claimed as new and useful is:

1. The combination with a door having a right angle chambered out portion at its lower edge portion adjacent the hinged edge portion, of a cover plate for the vertical part of the right angle chambered out portion, a support pivoted on the cover plate and substantially conforming to the right angle chambered out portion, a weather strip swingingly pivoted to the end of the horizontal arm of said support, said weather strip comprising a sheet metal holder, and a pliable sill engaging member carried by said sheet metal holder, means carried by one of the arms of the support and engaging between the bottom wall of the vertical chambered out portion of the hinged edge of the door and the support for urging the support, whereby it may tilt on its pivot for holding the weather strip raised when the door is open, said yieldingly urging means comprising a spring, and a pin with which the spring is in surrounding relation, said pin being pivoted to the vertical part of the support and protruding through the cover plate, to engage the jamb of the frame, to actuate the support for lowering the weather strip.

2. The combination with a door having a right angle chambered out portion at its lower edge part and adjacent the hinged part, of a cover plate for the vertical part of the right angle chambered out portion, a housing guide support pivoted on the cover plate and substantially conforming to the right angle chambered out portion, a pin carried by and threaded through the upper end of the vertical part of the support and loosely engaging through the cover plate and into the bottom wall of the vertical part of the right angle chambered out portion, said support comprising an elongated horizontal housing arm, an elongated U-shaped holder pivoted near its center to the extremity of the elongated housing arm and carrying a pliable sill engaging element, means for pivoting the support to the cover plate, and spring means in surrounding relation to the pin and interposed between the end of the vertical arm of the support and the bottom wall of the vertical part of the right angle chambered out portion acting to tension the support to hold the holder raised when the door is open.

In testimony whereof I hereunto affix my signature in the presence of two witnesses.

THOMAS M. CAMPBELL.

Witnesses:
 GEO. MAXWELL,
 F. N. DANIELS.